(12) United States Patent  
He et al.

(10) Patent No.: US 12,104,572 B2  
(45) Date of Patent: Oct. 1, 2024

(54) SEMI-SUBMERSIBLE FLOATING WIND POWER GENERATOR

(71) Applicant: SHANGHAI JIAO TONG UNIVERSITY, Shanghai (CN)

(72) Inventors: Yanping He, Shanghai (CN); Yongsheng Zhao, Shanghai (CN); Zhe Chen, Shanghai (CN); Yadong Liu, Shanghai (CN); Chao Huang, Shanghai (CN); Jie Yang, Shanghai (CN); Haoyu Wu, Shanghai (CN); Mingzhi Li, Shanghai (CN); Xiaoli Gu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 409 days.

(21) Appl. No.: 17/541,120

(22) Filed: Dec. 2, 2021

(65) Prior Publication Data

US 2022/0128035 A1    Apr. 28, 2022

Related U.S. Application Data

(63) Continuation-in-part of application No. PCT/CN2020/093680, filed on Jun. 1, 2020.

(30) Foreign Application Priority Data

Jun. 4, 2019 (CN) .......................... 201910482000.2

(51) Int. Cl.
*F03D 13/25* (2016.01)
*B63B 21/50* (2006.01)
*B63B 35/44* (2006.01)

(52) U.S. Cl.
CPC .............. *F03D 13/25* (2016.05); *B63B 21/50* (2013.01); *B63B 35/44* (2013.01);
(Continued)

(58) Field of Classification Search
CPC ......... F03D 13/25; B63B 21/50; B63B 35/44; B63B 2035/442; B63B 2035/446; F05B 2260/30; F05B 2240/97
See application file for complete search history.

(56) References Cited

U.S. PATENT DOCUMENTS

| 10,202,170 B2 * | 2/2019 | Dagher .................... F03D 13/25 |
| 2011/0006539 A1 * | 1/2011 | Lefranc .................... F03D 9/257 |
| | | 290/55 |
| 2016/0369780 A1 * | 12/2016 | Aubault .................. F03D 13/25 |

FOREIGN PATENT DOCUMENTS

| CN | 102235011 A | 11/2011 |
| CN | 202783720 U | 3/2013 |

(Continued)

OTHER PUBLICATIONS

International Search Report and Written Opinion for PCT/CN2020/093680, mailed Sep. 2, 2020. (with English translation of Search Report, 11 pages).

*Primary Examiner* — Stephen P Avila

(74) *Attorney, Agent, or Firm* — FOLEY & LARDNER LLP

(57) ABSTRACT

A semi-submersible floating wind power generator includes a wind power generator set, a post device, a load carrying device and a mooring device. The wind power generator set is disposed at a first end of the post device. The load carrying device is disposed at a second end of the post device. The mooring device is disposed at the second end of the post device. The post device includes a main post and multiple auxiliary posts. The main post is disposed in parallel with the multiple auxiliary posts, and second ends of the multiple auxiliary posts are aligned such that the second ends of the multiple auxiliary posts form a first plane, and the second end of the main post is disposed at a position closer to the first end of the main post than the first plane.

7 Claims, 3 Drawing Sheets

(52) U.S. Cl.
CPC ... *B63B 2035/442* (2013.01); *B63B 2035/446* (2013.01); *F05B 2240/97* (2013.01); *F05B 2260/30* (2013.01)

(56) References Cited

FOREIGN PATENT DOCUMENTS

| | | |
|---|---|---|
| CN | 104401458 A | 3/2015 |
| CN | 106014862 A | 10/2016 |
| CN | 109263818 A | 1/2019 |
| CN | 109441733 A | 3/2019 |
| CN | 109737014 A | 5/2019 |
| CN | 110203342 A | 9/2019 |
| CN | 210526798 U | 5/2020 |
| EP | 2 036 815 A1 | 3/2009 |
| EP | 3546337 A1 | 10/2019 |
| WO | WO-2018/096650 A1 | 5/2018 |

\* cited by examiner

SEMI-SUBMERSIBLE FLOATING WIND POWER GENERATOR

CROSS-REFERENCE TO RELATED APPLICATIONS

This application is a continuation-in-part of International Application No. PCT/CN2020/093680, filed Jun. 1, 2020, which claims benefit of and priority to Chinese Application No. 201910482000.2, filed Jun. 4, 2019, both of which are incorporated herein by reference in their entirety.

FIELD OF THE INVENTION

The present application relates to the field of offshore power generation, and in particular to a semi-submersible floating wind power generator.

DESCRIPTION OF THE PRIOR ART

In the field of offshore power generation, currently common floating foundations for wind power generators mainly include Spar (single post) type floating foundations, semi-submersible floating foundations and TLP (tension leg) type floating foundations. Technologies that are relatively close to the present application are the Spar type floating foundations and the semi-submersible floating foundations. The Spar type floating foundation has a cylindrical shape and is simple in structure. The center of gravity is lower than the center of buoyancy through ballast, and the hydrodynamic performance is better. The semi-submersible floating foundation has widely spaced posts, which can provide a certain restoring moment and has a small draft.

The disadvantages of the prior art are that the Spar type floating foundation has a relatively large draft, generally reaching 80 m or more, so it is not suitable for use in relatively shallow waters, and its small waterline area results in a small moment of inertia at the waterline surface, which cannot contribute to the stability of roll and pitch. Compared with the Spar type floating foundation, the semi-submersible floating foundation is more complicated in structure, and the diameters of its posts are usually larger, usually reaching ⅛ of the wave wavelength. This results in a larger response of the post to wave load and motion.

There are also some Spar type floating foundations with relatively shallow drafts in the prior art, which are suitable for scenes with water depths below 50 m. However, the Spar type floating foundations with relatively shallow drafts in the prior art have relatively large areas at their waterline surfaces, which leads to relatively large wave loads on the structures, poor hydrodynamic performances, and inconvenient manufacturing and assembly, which also affects the economic benefits. In addition, in the prior art, no measures are taken to lower the center of gravity, so the stability is poor. When the foundation is tilted, a part of the foundation emerges from the water, resulting in a decrease in draft volume and thus an increase in draft depth.

SUMMARY OF THE INVENTION

In view of the deficiencies of the prior art, the purpose of the present application is to provide a semi-submersible floating wind power generator, comprising a wind power generator set, a post device, a load carrying device and a mooring device, wherein:

the wind power generator set is disposed at a first end of the post device;

the load carrying device is disposed at a second end of the post device;

the mooring device is disposed at the second end of the post device; and the post device comprises a main post and a plurality of auxiliary posts, wherein the main post is disposed in parallel with the plurality of auxiliary posts, and second ends of the plurality of auxiliary posts are aligned such that the second ends of the plurality of auxiliary posts form a first plane, and the second end of the main post is disposed at a position closer to the first end of the main post than the first plane.

Optionally, the main post is a cylinder, and the wind power generator set is connected to the first end of the main post.

Optionally, the plurality of auxiliary posts are all cylindrical, and the load carrying device is connected to the second ends of the auxiliary posts.

Optionally, the main post is fixedly connected to each of the auxiliary posts through a supporting member, respectively.

Optionally, the supporting member comprises supporting rods, first ends of the supporting rods are connected to the main post, and second ends of the supporting rods are connected to the auxiliary posts, and the first ends of the supporting rods are disposed at positions closer to the first end of the main post than the second ends of the supporting rods.

Optionally, the number of the auxiliary posts is three, wherein a first auxiliary post is fixedly connected to the main post through a first supporting rod, a second auxiliary post is fixedly connected to the main post through a second supporting rod, and a third auxiliary post is fixedly connected to the main post through a third supporting rod.

Optionally, the distances between the first auxiliary post and the main post, between the second auxiliary post and the main post, and between the third auxiliary post and the main post are the same.

Optionally, the first auxiliary post, the second auxiliary post, and the third auxiliary post are evenly disposed on a circumference around the main post.

Optionally, projections of the first supporting rod, the second supporting rod and the third supporting rod on the first plane form an included angle of 120 degrees between each other.

Optionally, the diameters of the auxiliary posts are one-tenth of the wave wavelength.

Optionally, the diameters of the first supporting rod, the second supporting rod and the third supporting rod are 5 meters.

Optionally, the load carrying device comprises post bases, and each of the post bases is disposed at the second end of each of the auxiliary posts.

Optionally, each of the post bases is fixedly connected to the main post through a first truss member, and the number of the first truss member is three.

Optionally, a first end of each of the first truss members is connected to the second end of the main post, and a second end of each of the first truss members is connected to the post base, and the first end of each of the first truss members is disposed at a position closer to the first end of the main post than the second end of said first truss member.

Optionally, projections of the first truss members on the first plane form an angle of 120 degrees between each other.

Optionally, adjacently disposed post bases are connected to each other through a second truss member, and the number of the second truss members is three.

Optionally, the second truss members are disposed parallel to the first plane.

Optionally, adjacent ones of the second truss members form an angle of 60 degrees between each other.

Optionally, the mooring device is connected to the second ends of the auxiliary posts.

Optionally, the mooring device comprises an anchor chain of a catenary type.

Compared with the prior art, the present application has at least the following technical effects:

1. In the present application, the position of the center of gravity can be lowered by using the post bases containing ballast at the bottom, the position of the center of buoyancy can be improved by arranging the supporting rods at the upper part of the draft part of the floating foundation and the main post at a higher position, and the combination of the two ensures that the center of gravity of the floating foundation is lower than the center of buoyancy, thereby improving the stability and hydrodynamic performance of the floating foundation;
2. In the present application, by arranging the plurality of auxiliary posts and supporting rods with larger diameters, the draft depth of the floating foundation can be reduced and the problem that the Spar type floating foundation can't be applied to a sea area with a water depth of 50 m because of its too large draft depth is solved;
3. In the present application, by arranging the supporting rods with larger diameters to provide drainage volume, the diameters of the auxiliary posts can be smaller, so that on one hand, the area of the waterline surface is reduced, thereby reducing the wave force received and improving the hydrodynamic performance, and on the one hand, the manufacturing cost is reduced and the assembly is also convenient; and
4. In the present application, with the supporting rods arranged obliquely, even if the floating foundation is tilted, the supporting rods will not emerge from the water, so the draft depth of the floating foundation will not be affected.

BRIEF DESCRIPTION OF THE DRAWINGS

By reading the following detailed description made with reference to the drawings for non-limiting embodiments, the other features, objectives and advantages of the present application will become more apparent.

DETAILED DESCRIPTION OF THE PREFERRED EMBODIMENTS

The present application will be described in detail below in conjunction with a specific embodiment. The following embodiment will help those skilled in the art to further understand the present application, but do not limit the present application in any form. It should be noted that, for those of ordinary skills in the art, several variations and improvements can be made without departing from the inventive concepts of the present invention. These all fall within the protection scope of the present invention.

It should be noted that, in the present application, the main post and auxiliary posts are all cylindrical. Under normal circumstances, the main post and auxiliary posts of cylindrical bodies are all vertically disposed in the direction of gravity. In the state of vertical arrangement, for the main post and the auxiliary posts, the ends facing away from the direction of gravity are called the "first ends", and the ends facing the direction of gravity are called the "second ends".

Embodiment 1

Figure 1:
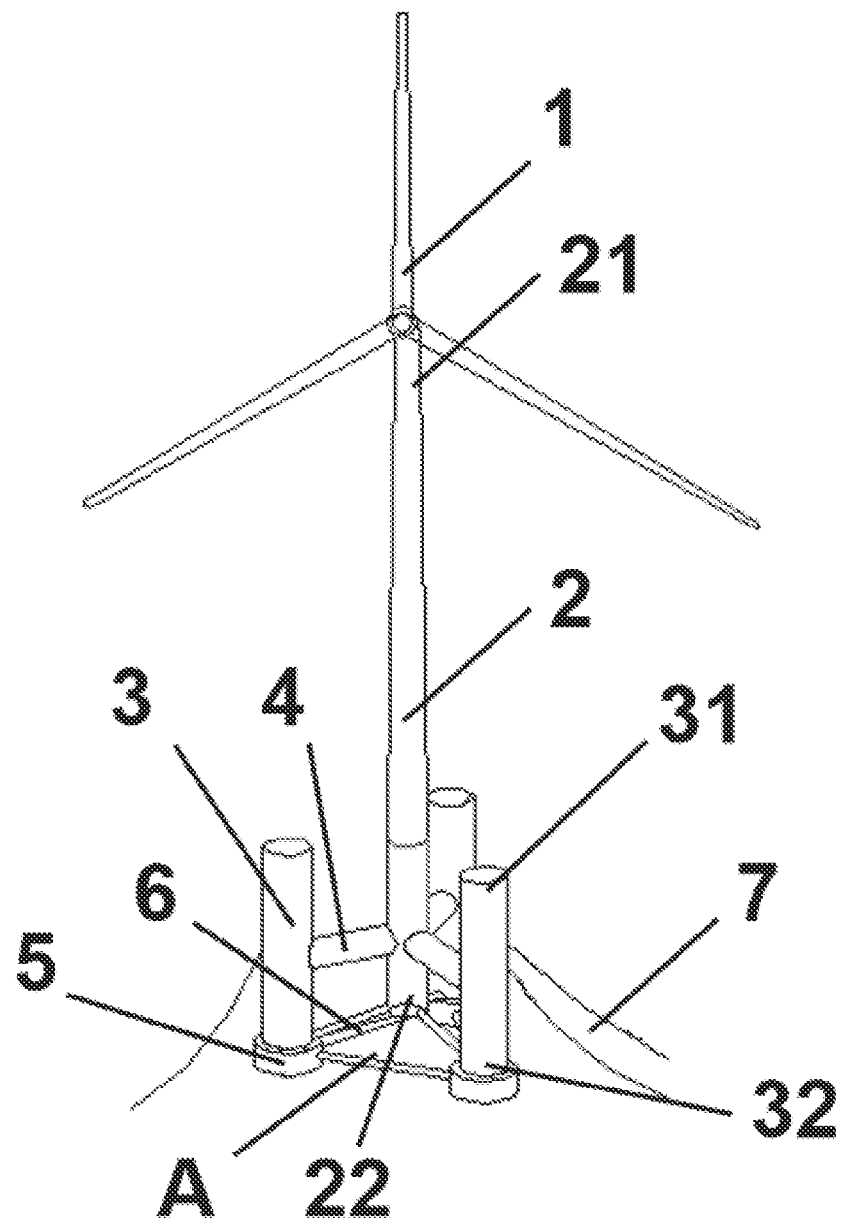
FIG. 1 is a schematic three-dimensional view of an embodiment of the present application.

As shown in FIG. 1, this embodiment comprises a semi-submersible floating wind power generator, which comprises a wind power generator set 1, a main post 2, auxiliary posts 3, post bases 5, and a mooring device 7. The main post 2 and the auxiliary posts 3 form a post device. The post bases 5 form a load carrying device. In the figures:

The wind power generator set 1 is disposed at a first end 21 of the main post 2. Preferably, the wind power generator set 1 is a horizontal axis type or vertical axis type wind power generator set;

the post bases 5 are disposed at second ends 32 of the auxiliary posts 3; and the mooring device 7 is disposed at the second ends 32 of the auxiliary posts 3.

Preferably, this embodiment comprises a main post 2 and three auxiliary posts 3, and the main post 2 and the three auxiliary posts 3 are disposed parallel to each other. Preferably, the main post 2 and the auxiliary posts 3 are all cylindrical, and preferably, the length of the main post 2 is 38 meters. On one hand, it is simple in structure and convenient to manufacture; and on the other hand, it can reduce the wave load, thus adapting to various sea conditions. The second ends 32 of the three auxiliary posts 3 are aligned such that the second ends 32 of the three auxiliary posts 3 form a first plane A. A second end 22 of the main post 2 is disposed at a position closer to the first end 21 of the main post 2 than the first plane A. That is, when this embodiment is placed in a normal vertical position, the bottom surfaces of the three auxiliary posts 3 are at the same height, while the bottom surface of the main post 2 is higher than the bottom surfaces of the auxiliary posts 3. Preferably, the interiors of the auxiliary posts 3 are partitioned into a plurality of small compartments with waterproof boards to improve the sinking resistance. Preferably, the underwater length of the main post 2 is 25 m, and the underwater lengths of the auxiliary posts 3 are 30 m. This makes the floating foundation applicable to a wide range of water depths. The underwater length of the main post 2 is smaller than the underwater lengths of the auxiliary posts 3 to improve the position of the center of buoyancy.

Figure 2:
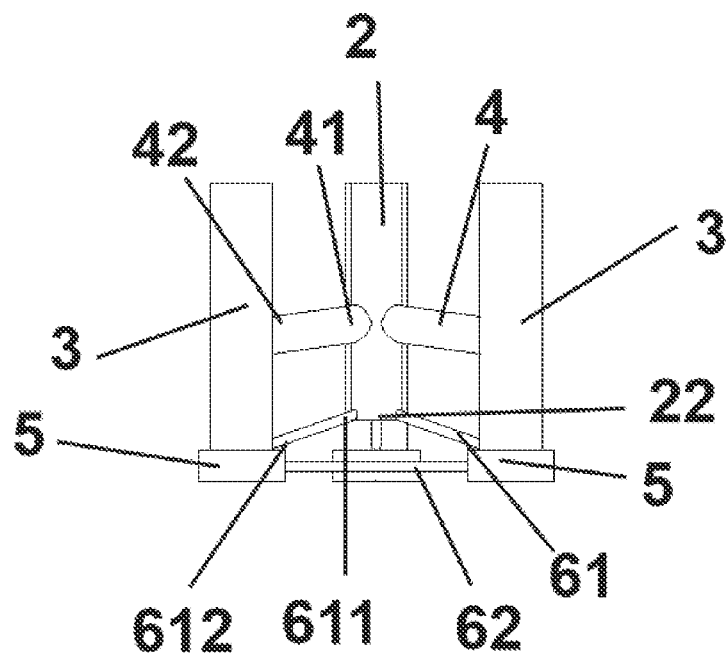
FIG. 2 is a schematic view of a partial structure of an embodiment of the present application.

As shown in FIG. 2, the main post 2 is connected to each auxiliary post 3 through a supporting rod 4. Specifically, a first end 41 of the supporting rod 4 is fixedly connected to the main post 2, and a second end 42 of the supporting rod 4 is fixedly connected to the auxiliary post 3. For each supporting rod 4, the position of the first end 41 is closer to the first end 21 of the main post 2 than the position of the second end 42. That is, when this embodiment is placed in a normal vertical position, the first end 41 of the supporting rod 4 fixedly connected to the main post 2 is in a position higher than that of the second end 42 of the supporting rod 4 fixedly connected to the auxiliary post 3. The three supporting rods 4 are all located above half of the overall draft of the floating foundation to improve the overall center of buoyancy. The supporting rod 4 has a certain length, and when the floating foundation is tilted by an external force, it can provide a certain restoring moment to make it to return to the initial equilibrium position. The supporting rod 4 is in an inclined layout, and when the floating foundation is floating, the end connected to the main post 2 is higher, and the end connected to the auxiliary post 3 is lower, such that the supporting rod forms a certain angle with the horizontal plane, which is about 10 degrees, so as to avoid the overall loss of buoyancy caused by exposing of the waterline surface due to the inclination of the floating foundation. In some existing technologies, the main post and the auxiliary posts are connected by truss members. Due to the small diameter of the truss member, it is impossible to provide enough drainage volume or buoyancy. In this embodiment, the preferred diameter of the supporting rod 4 is 5 meters, which is 2-3 times the diameter of a common truss member. In contrast, it is possible to provide greater buoyancy. On one hand, by using supporting rods 4 with large diameters to provide sufficient buoyancy, the diameters of the auxiliary posts 3 can be reduced. In this embodiment, the diameters of the auxiliary posts 3 are preferably 1/10 of the wave wavelength under a rated working sea condition, which can reduce the waterline surface area of the auxiliary posts 3, thereby reducing the wave force received and improving the hydrodynamic performance. On the other hand, the use of a supporting rod 4 with a large diameter can reduce the overall draft of the floating foundation, so that the floating foundation can be applied to shallow seas with a depth of less than 50 meters.

As shown in FIG. 2, the second end of each auxiliary post 3 is provided with a post base 5, that is, three post bases 5 are provided in this embodiment. Ore sand or other ballast is disposed inside the post bases 5 for lowering the overall center of gravity of the floating foundation. Therefore, the center of gravity is lower than the center of buoyancy. Compared with the auxiliary posts 3, the post bases 5 have larger diameters, which can act like a heave plate to increase heave damping. Each post base 5 is connected to the main post 2 through a first truss member 61, and adjacent post bases 5 are connected to each other through a second truss member 62. A first end 611 of the first truss member 61 is connected to the second end 22 of the main post 2, and a second end 612 of the first truss member 61 is connected to the post base 5. The first end 611 of each first truss member 61 is disposed at a position closer to the first end 21 of the main post 2 than the second end 612 of the first truss member 61. That is, when this embodiment is placed in a normal vertical position, the first end 611 of the first truss member 61 is in a position higher than that of the second end 612 of the first truss member 61. The second truss member 62 is used for mutual connection between the post bases 5.

Figure 3:
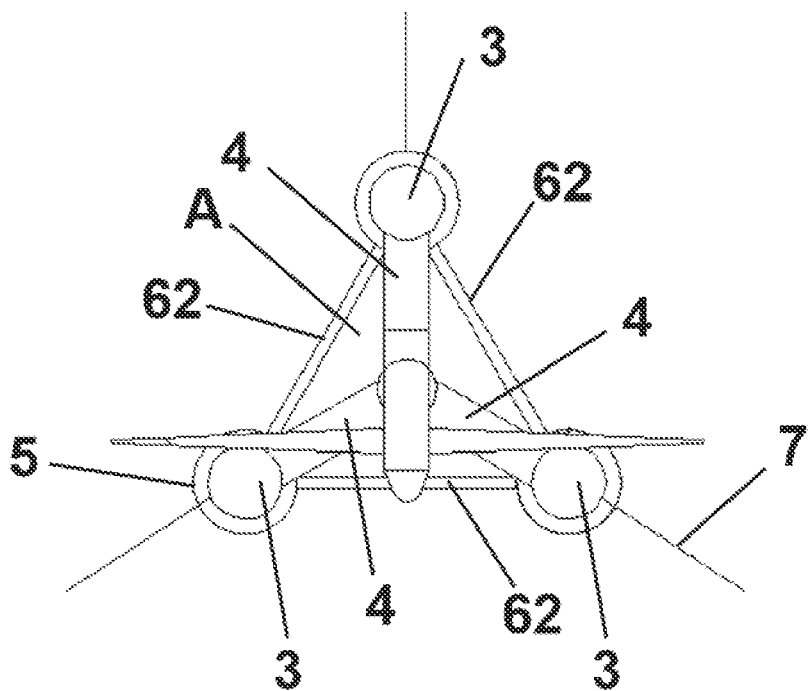
FIG. 3 is a schematic top view of a structure of an embodiment of the present application.

As shown in FIG. 3, three auxiliary posts 3 are disposed around the main post 2. Preferably, the distances between the three auxiliary posts 3 and the main post 2 are the same. More preferably, the three auxiliary posts 3 are evenly disposed on a circumference around the main post 2. Projections of the three supporting rods 4 for connecting the auxiliary posts 3 and the main post 2 are formed on the first plane A, with an included angle of 120 degrees between each other. In this embodiment, the projections formed by the three first truss members 61 on the first plane A overlap with the projections formed by the three supporting rods 4, and therefore the projections formed by the three first truss members 61 also form an included angle of 120 degrees between each other. In this embodiment, three second truss members 62 are provided. Since the post bases 5 are disposed on the second ends 32 of the auxiliary posts 3, the three second truss members 62 are all disposed in parallel with the first plane A. Since the three auxiliary posts 3 are evenly disposed on a circumference around the main post 2, the angle between every two of the three second truss members 62 is 60 degrees. The first truss members 61 and the second truss members 62 have the function of enhancing the structural strength.

The middle parts of the auxiliary posts 3 are connected to the mooring device 7. One ends of the mooring device 7 are connected to the auxiliary posts 3 through fairleads, and the other ends of the mooring device 7 are connected to the seabed through anchor points. The mooring device 7 may be of a catenary type or a cable-stayed tension type. Preferably, the mooring device 7 is an anchor chain of the catenary type. Each auxiliary post 3 is connected to the mooring device 7 to limit the six-degree-of-freedom movement of the offshore wind power generation device.

Figure 4:
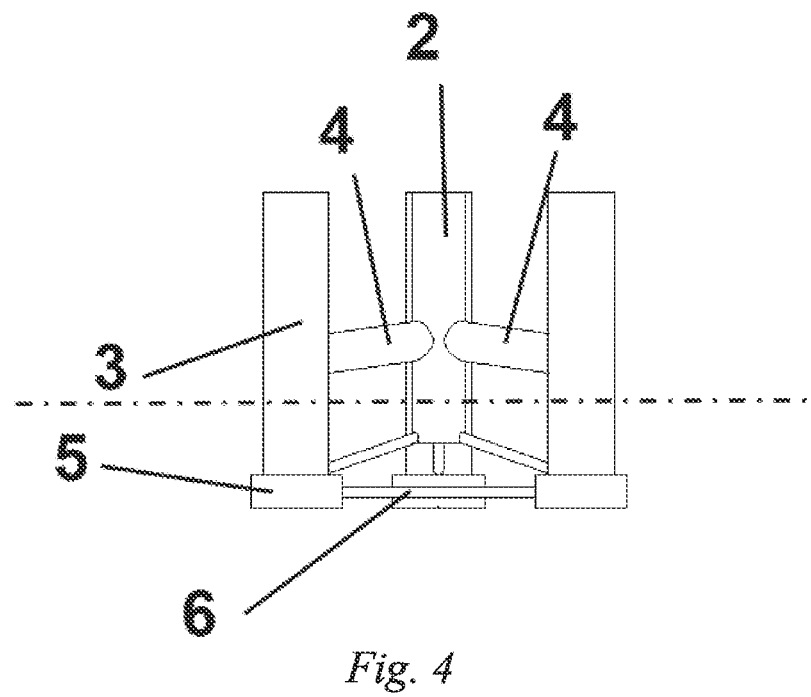
FIG. 4 is a schematic view of the draft when a wind power generator set is not loaded in an embodiment of the present application.
Figure 5:
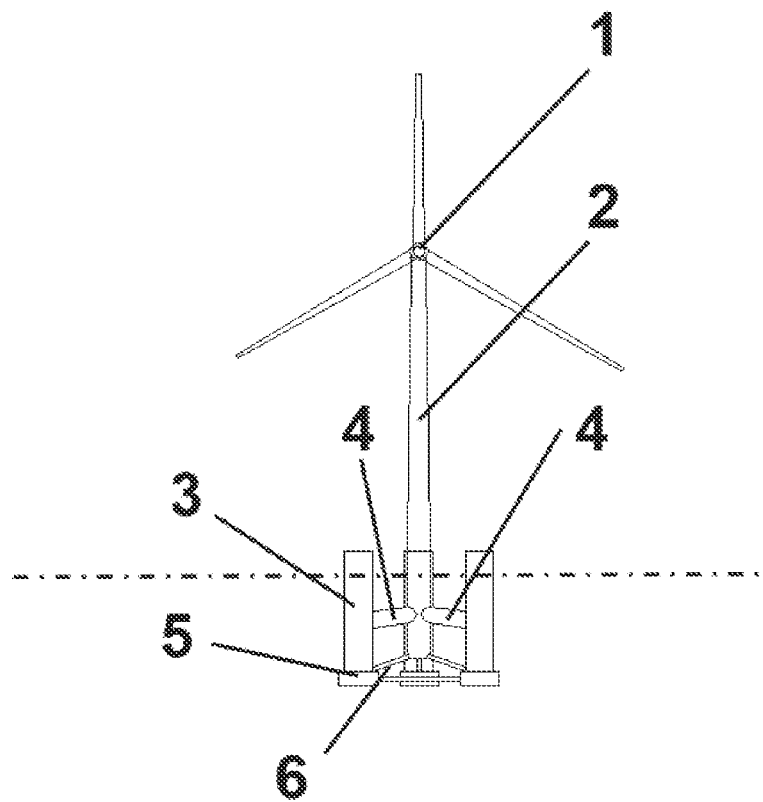
FIG. 5 is a schematic view of the draft when a wind power generator set is loaded in an embodiment of the present application.

As shown in FIG. 4, when the floating foundation is not loaded with a wind power generator set, the waterline (indicated by a dotted line in the figure) is below the supporting rods 4, and the supporting rods 4 do not provide buoyancy. As shown in FIG. 5, when the floating foundation is loaded with the wind power generator set 1, the waterline (indicated by a dotted line in the figure) is above the supporting rods 4, and the supporting rods 4 do not provide buoyancy. Since the supporting rods 4 are located in upper positions in the underwater part of the floating foundation, it can improve the position of the buoyancy center and increase the stability of the floating foundation.

During the manufacture of this embodiment, various structural members can be prefabricated in sections first, and after the assembly is completed in a dry dock, since the floating foundation with unpressurized load still has a certain draft and stability, it can be towed by a tug to a target sea area. In this embodiment, since a ballast device 5 uses ore sand with a density of 4 tons per cubic meter, it can be filled after reaching an assembly site, which facilitates the transportation of the floating foundation and can also realize the righting of the floating foundation after entering the water. Finally, the mooring device 7 and the wind power generator set 1 are assembled.

In this embodiment, inclined cylindrical supporting rods 4 located below the waterline are used to provide a certain buoyancy and move the overall center of buoyancy upward, and reduce the drainage volume requirement of the auxiliary posts 3, thereby reducing the diameters of the auxiliary posts 3 and obtaining a good hydrodynamic performance. The lower ends of the auxiliary posts 3 use the post bases 5 with larger diameters as fixed ballast tanks, which have the functions of lowering the overall center of gravity below the center of buoyancy and increasing the heave damping.

A specific embodiment of the present application is described above. It should be understood that the present application is not limited to the above specific implementation, and those skilled in the art can make various changes or modifications within the scope of the claims, which does not affect the essence of the present application. In the case of no conflict, the embodiment of the present application and the features in the embodiment can be combined with each other arbitrarily.

The invention claimed is:

1. A semi-submersible floating wind power generator, comprising a wind power generator set, a post device, a load carrying device and a mooring device, wherein:
    the wind power generator set is disposed at a first end of the post device;
    the load carrying device is disposed at a second end of the post device;
    the mooring device is disposed at the second end of the post device; and
    the post device comprises a main post and a plurality of auxiliary posts, wherein the main post is disposed in parallel with the plurality of auxiliary posts, and second ends of the plurality of auxiliary posts are aligned such that the second ends of the plurality of auxiliary posts form a first plane, and the second end of the main post is disposed at a position closer to the first end of the main post than the first plane,
    wherein the main post is a cylinder, and the wind power generator set is connected to the first end of the main post,
    wherein the plurality of auxiliary posts are all cylindrical, and the load carrying device is connected to the second ends of the auxiliary posts,
    wherein the main post is fixedly connected to each of the auxiliary posts through a supporting member, respectively,
    wherein the supporting member comprises supporting rods, first ends of the supporting rods are connected to the main post, and second ends of the supporting rods are connected to the auxiliary posts, and the first ends of the supporting rods are disposed at positions closer to the first end of the main post than the second ends of the supporting rods,
    wherein the number of the auxiliary posts is three, wherein a first auxiliary post is fixedly connected to the main post through a first supporting rod, a second auxiliary post is fixedly connected to the main post through a second supporting rod, and a third auxiliary post is fixedly connected to the main post through a third supporting rod,
    wherein the distances between the first auxiliary post and the main post, between the second auxiliary post and the main post, and between the third auxiliary post and the main post are the same,
    wherein the first auxiliary post, the second auxiliary post, and the third auxiliary post are evenly disposed on a circumference around the main post,
    wherein projections of the first supporting rod, the second supporting rod and the third supporting rod on the first plane form an included angle of 120 degrees between each other,
    wherein diameters of the auxiliary posts are one-tenth of a wave wavelength,
    wherein the diameters of the first supporting rod, the second supporting rod and the third supporting rod are 5 meters,
    wherein the load carrying device comprises post bases, and each of the post bases is disposed at the second end of each of the auxiliary posts,
    wherein each of the post bases is fixedly connected to the main post through a first truss member, and the number of the first truss member is three, and
    wherein a first end of each of the first truss members is connected to the second end of the main post, and a second end of each of the first truss members is connected to the post base, and the first end of each of the first truss members is disposed at a position closer to the first end of the main post than the second end of said first truss member.

2. The semi-submersible floating wind power generator of claim 1, wherein projections of the first truss members on the first plane form an angle of 120 degrees between each other.

3. The semi-submersible floating wind power generator of claim 2, wherein adjacently disposed post bases are connected to each other through a second truss member, and the number of the second truss members is three.

4. The semi-submersible floating wind power generator of claim 3, wherein the second truss members are disposed parallel to the first plane.

5. The semi-submersible floating wind power generator of claim 4, wherein adjacent ones of the second truss members form an angle of 60 degrees between each other.

6. The semi-submersible floating wind power generator of claim 5, wherein the mooring device is connected to the second ends of the auxiliary posts.

7. The semi-submersible floating wind power generator of claim 6, wherein the mooring device comprises an anchor chain of a catenary type.

* * * * *